E. M. HEYLMAN, DEC'D.
CITIZEN'S TRUST & SAVINGS BANK, ADMINISTRATOR.
AUTOMATIC CLUTCH THROW-OUT FOR TRACTORS.
APPLICATION FILED JAN. 29, 1919.
1,378,954.
Patented May 24, 1921.
2 SHEETS—SHEET 1.
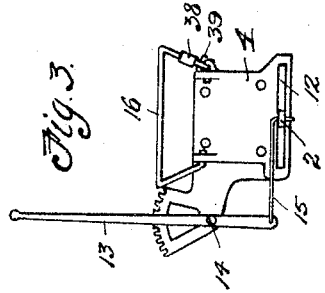
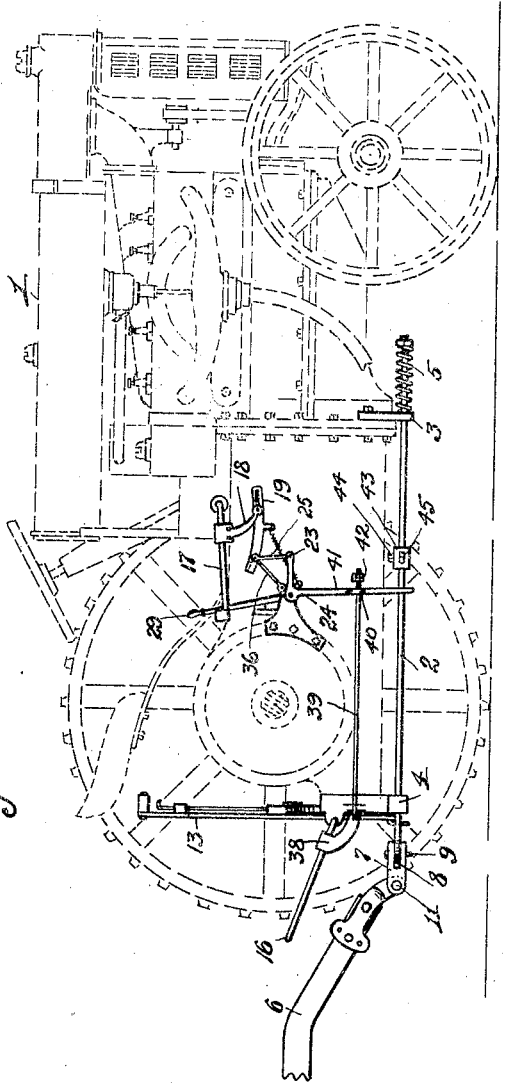
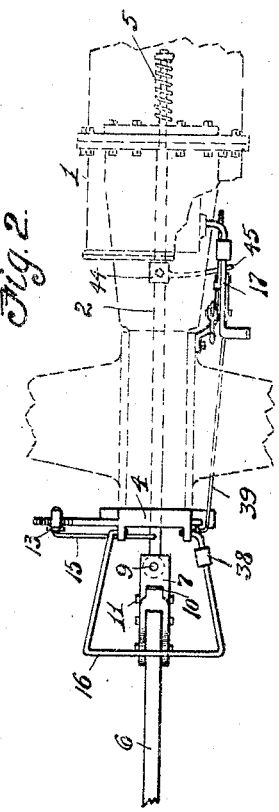
Edward M. Heylman.
INVENTOR
By George J. Stsch
ATTORNEY.

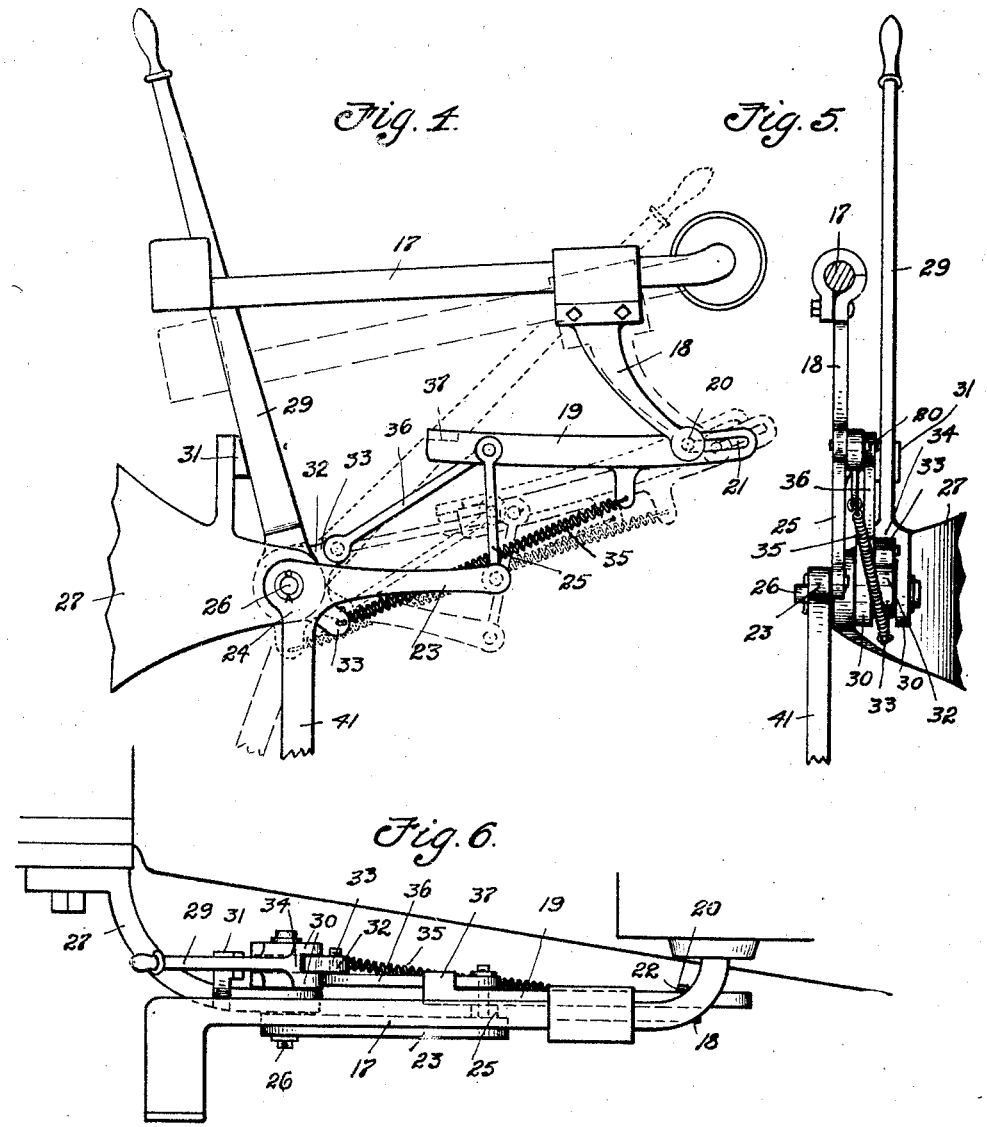

UNITED STATES PATENT OFFICE.

EDWARD M. HEYLMAN, OF SOUTH BEND, INDIANA; CITIZEN'S TRUST & SAVINGS BANK, OF SOUTH BEND, INDIANA, ADMINISTRATOR OF SAID EDWARD M. HEYLMAN, DECEASED.

AUTOMATIC CLUTCH THROW-OUT FOR TRACTORS.

1,378,954.     Specification of Letters Patent.     Patented May 24, 1921.

Application filed January 29, 1919. Serial No. 273,818.

*To all whom it may concern:*

Be it known that I, EDWARD M. HEYLMAN, a citizen of the United States, residing at South Bend, in the county of St. Joseph and State of Indiana, have invented certain new and useful Improvements in Automatic Clutch Throw-Outs for Tractors, of which the following is a specification.

The invention relates to an improvement in tractor clutch throw-outs, wherein provision is made for automatically throwing out the clutch in the event the tractor, due to causes subsequently explained, proceeds to turn over backward, and thus prevent possible injury to the tractor as well as the driver thereof, as well as the additional provision for a like action in the event of an overload on the draw bar, whereby to prevent a possible breaking strain on the implement being drawn by the tractor.

The invention generally comprehends a means instantly responsive to shift the clutch controlling the transmission of power from the engine to the drive mechanism to release position, upon a raising of the front end of the tractor off of the ground to a predetermined degree, and thus automatically preventing the same from being turned over backward completely. Experience has shown that such happens frequently with certain light weight tractors when the drive wheels are blocked against movement, as when sunken in a rut, and the driver applies the full power of the engine and shifts into low gear, thus causing the rear axle drive gearing to operate to turn the tractor bodily backward on the axle. The invention further comprehends means automatically responsive to excessive draw bar strain to release the clutch, as when an implement drawn by the tractor becomes lodged against under surface obstacles, as tree roots and stones, whereby the tractor is held against further movement under power of the engine, and a breaking strain, incident to a continuance of an excessive load strain on the implement, avoided. The means utilized in carrying out the details of the invention is designed to permit the driver to regain immediate control of the clutch following such automatic release, so that the tractor may be reversed or continued in movement without first relieving the load strain which influences the clutch releasing means. This permits the driver to regain control of the movement of the tractor at any and all times, and without regard to the automatic throw-out, so that the function of the latter is that of an automatic protector without interfering in any particular with the usual manual control.

The invention in the preferred form of details will be described in the following specification, reference being had particularly to the accompanying drawings, in which:—

Figure 1 is a view in elevation, illustrating a tractor with the automatic throw-out in position.

Fig. 2 is a plan of the rear end of the tractor showing the throw-out details.

Fig. 3 is an elevation showing the adjusting means for varying the line of draft of the draw bar.

Fig. 4 is an enlarged view in elevation of the clutch lever and immediate actuating parts therefor, the long dash lines showing the position of the parts when operated to release the clutch lever, and the operation or movement of the parts manually operated immediately succeeding the automatic operation to release the clutch, being shown in short dotted lines.

Fig. 5 is an end elevation of the parts shown in Fig. 4, with the clutch lever shown in section.

Fig. 6 is a similar view in plan.

The improved automatic throw-out is here shown as applied to a tractor, designated generally as 1, and includes a draw-bar 2, mounted in front and rear hangers 3 and 4. A spring 5 is coiled about the draw-bar in advance of the forward hanger 3, which spring is tensioned to resist compression under a load strain to a predetermined degree, a further compression under excessive load strain permitting a longitudinal movement of the draw-bar. Adapted to be attached to the rear end of the draw-bar, is what I broadly term a hitch beam 6, the particular form of which is immaterial, and which may be a plow beam or other part of an implement commonly employed for connection with the traction power. For the purposes of the present invention, said hitch beam is coupled to the draw-bar by means of a coupling 7, having a transverse slot 8 to receive the end of the draw-bar, which parts have a coupling pin 9 passing therethrough to effect a pivotal connection therebetween, the outer end of the coupling 7 having a vertical slot 10 to receive the end of a clevis or other connection, with a coupling pin 11 connecting said parts in a manner to permit relative movement in a vertical plane between the beam and the tractor. The rear hanger 4 is provided with an elongated slot 12 through which the draw-bar passes, and which permits the latter to be laterally shifted for the purpose of varying the line of draft thereof with respect to the tractor. For the purpose of conveniently permitting the draw-bar to be so shifted, a lever 13 is provided as shown, which is fulcrumed at 14 to an extension of the bracket, and the lower end of which has connection with the draw-bar by means of a rod 15 in a manner to permit pivotal movement between said parts and the rod. A spring pressed latch and notched sector of a common type are employed to maintain the desired adjustment of the lever.

Suitably and preferably mounted upon the hanger 4, and supported in a manner to permit its free end to swing in a vertical plane, is what may be termed a trip-bail 16, in order to distinguish same from a trip-arm hereinafter noted. The free end of said trip-bail is adapted to overhang the hitch beam 6, and to be normally spaced therefrom at a predetermined distance, so that any excessive backward incline of the tractor, as by a backward turn thereof, will cause the trip-bail to be engaged by the hitch beam 6 and swing the same upwardly, which movement in turn will influence means, presently explained, to move the clutch lever 17 to release position.

Suitably fixed to and depending from the clutch lever 17 is a curved arm 18, the end of which has a sliding connection with one end of a shift-bar 19, by means of an integrally formed and laterally extending pin 20 on said arm end passing through an elongated slot 21 in the shift-bar, and held against disengagement by a cotter pin 22. Such sliding connection between said parts permits the clutch lever to be manually operated in the usual manner without interference by the means provided for automatically operating the same, as will be obvious.

The shift-bar 19 has connection with the short arm 23 of the angle lever 24 by means of a drag link 25 pivotally connected in a suitable manner with said parts, the angle lever 24 being fulcrumed, as at 26, on a bracket 27 suitably fixed to the tractor body. Pivotally mounted on the bracket 27 on the inner side thereof, and preferably by the same pivot pin 26 which fulcrums the angle lever 24, is a release lever 29 formed at its lower end with spaced opposing jaws 30, through which space the pivot pin 26 passes, and which lever is limited in its backward swing by a stop 31 extending from the bracket 27. Mounted for pivotal movement on the pivot pin 26 and between the jaws 30 of the lever 29, is a rocker plate 32, having spaced edgewise extending ears 33, the rocker plate being limited in its movement to the left with respect to the release lever 29 by the crotch portion 34 of said lever, from which it follows that, upon shifting of the lever to position shown in Fig. 4, the rocker plate will be rocked by such lever movement to the position shown in dotted lines. The object in providing a limited independent movement between the release lever and the rocker plate, is to permit return of the rocker plate to normal position under the influence of a spring 35, thus relieving said spring of the burden of retracting the release lever in addition to its other functions, as will further on appear. The release lever is thus intended to be retracted manually. Connecting the upper ear 33 of the rocker plate with the proximate end of the shift-bar 19, is a radius rod 36, pivotally connected with said parts in any suitable manner, the shift-bar having an integrally formed stop 37 to limit the movement of the radius rod with respect to said bar.

Suitably mounted upon the trip bail 16 is a curved arm 38, to the end of which is pivotally attached one end of a pull rod 39, the opposite end of which passes through an eye 40 in the long arm 41 of the angle lever 24, an adjustable nut 42 screw-threaded upon the rod serving as a stop to engage and move the angle lever upon upward movement of the trip bail 16. Mounted upon the draw-bar 2 is a sleeve 43 adjustably secured thereto by a set screw 44, and from which sleeve projects a trip-arm 45 adapted to engage the angle lever in the movement of the draw-bar.

It will be apparent from the foregoing that, either upon an excessive backward turn of the tractor, or considerable drop of the rear end thereof induced by the digging action of the traction wheels in soft ground under excessive load, the trip-bail 16 will be raised by contact with the hitch beam 6, which movement, through the connections noted, will impart a downward pull upon the rear end of the shift-bar, which movement at the same time results in the radius rod imparting an endwise shift to the shift-bar, thus moving the clutch lever to release position, in which movement the parts will be in the position indicated by the long dash lines in Fig. 4. When the parts are in said throw-out position, the point of connection between the drag link and shift-bar will be slightly below a line centering the points of connection of the radius rod with the rocker bar and the end of clutch lever arm with the shift-bar, thus locking the parts against retraction. This is important for the reason that a release of the clutch lever immediately following a throw-out movement thereof, with the engine running idle at great speed, and happening before the transmission gear could be shifted to neutral position, might result in serious injury to the engine or the clutch. In the movement of said parts to locked position, the spring 35, which is terminally connected with the shift-bar and with the lower ear 33 of the rocker bar, is brought under increased tension, and serves to retract the parts in a manner as will presently appear.

In order to permit immediate control of the clutch by the driver following the release thereof, and with the conditions still prevailing which resulted in actuating the throw-out mechanism, and which conditions would prevent return of the angle lever 24 to normal position, and therefore the return of the remaining parts to a like position, means are provided for releasing the parts without first removing the cause which prevents return of the angle lever. Said means consists of the release lever 29 and the rocker plate 32. With the angle lever 24 held in the position indicated by long dash lines as shown in Fig. 4, which is the position thereof at the completion of the throw-out movement, the release lever is shifted forwardly, causing the rocker bar to be carried with it to a point where the radius rod end pivoted thereto is below the fulcrum point of the angle lever, when the shift-bar is no longer restrained against endwise retraction by the radius rod because the rocker bar is free at that point to continue its movement independent of the release lever. Immediately the rocker bar is shifted below center the greater tension of the clutch retracting spring with respect to the spring 35 will cause the parts to shift to the positions indicated by the short dash lines, thus releasing the clutch lever for free control of the driver. After having removed the conditions which prevented return movement of the angle lever, all parts are restored to normal position under the influence of the spring 35, with the exception of the release lever, which is manually returned to normal position, and the object of which is to lessen the work to be performed by said spring, so that the same may be of less strength than the clutch operating spring, for the purpose above pointed out.

Obviously, the throw-out mechanism will be actuated in the same manner as hereinabove pointed out by an overload strain on the draw-bar 2. Thus when the overload overcomes the predetermined resisting tension of the spring 5, the trip arm 45, by a shifting of the draw-bar, engages the angle lever 24, with the same effect to operate the throw-out mechanism as affected by actuation of the trip-bail 16. The tractor will thus be automatically released from farther movement under the power of the engine by movement of the clutch lever to release position, and a breaking strain on the tractor parts and the drawn implement, incident to a continuance of the excessive load strain, avoided.

While the foregoing is the preferred form of my invention, I desire it to be understood that I do not limit myself to the exact structure shown and described, as it is obvious that the same may be variously modified without departing from the spirit of the invention.

What is claimed is:—

1. The combination with a tractor having a clutch operating lever and the hitch of an implement drawn by the tractor, of means actuated by a tilting movement of the tractor, with relation to the hitch, operating to move the lever to release position.

2. The combination with a tractor having a clutch operating lever and the hitch of an implement drawn by the tractor, of means actuated by a tilting movement of the tractor, with relation to the hitch, operating to move the lever to release position, and means actuated by an overload pull on the hitch operating to release the clutch.

3. The combination with a tractor having clutch operating mechanism, of means movable by a backward tilting movement of the tractor operating to actuate said mechanism to release the clutch.

4. The combination with a tractor having clutch operating mechanism, of means movable by a backward tilting movement of the tractor operating to actuate said mechanism to release the clutch, and means operable to free said mechanism from the influence of said means without first restoring the latter to normal position.

5. The combination with a tractor having clutch operating mechanism; of two independently operable means adapted to actuate said mechanism to move the clutch to release position, one of said means being influenced by a backward tilt of the tractor, and the other by an overload pull of the tractor.

6. The combination with a tractor having clutch operating mechanism, of two independently operable means adapted to actuate said mechanism to move the clutch to release position, one of said means being influenced by a backward tilt of the tractor, and the other by an overload pull of the tractor, and means operative to free said mechanism from the actuating means without first restoring the latter to normal position.

7. The combination with a tractor having a clutch lever and the hitch beam of a drawn implement, of a member movable by contact with the hitch beam upon an excessive backward tilt of the tractor, and clutch operating means connected with and actuated by said member to release the clutch.

8. The combination with a tractor having a clutch lever and the hitch beam of a drawn implement, of a throw-out for the clutch lever comprising a hinged element mounted on the tractor with its free end normally overreaching the hitch beam, and connections between said element and the clutch lever adapted to operate said lever to release position upon movement of said element through contact with the hitch beam.

9. The combination with a tractor having a clutch lever and the hitch beam of a drawn implement, of a trip member influenced by the hitch beam upon an excessive backward tilt of the tractor, an angle lever, a connection between the trip member and said lever, a shift-bar, an arm carried by the clutch lever having pivotal connection with the shift-bar, a radius link pivotally connected with the shift-bar and a support, and a drag link pivotally connected with the shift-bar and the angle lever.

10. The combination with a tractor having a clutch lever and the hitch beam of a drawn implement, of a trip member carried by the tractor and adapted to be actuated through contact with said hitch beam, an angle lever operatively connected with the trip member, a shift-bar, an arm carried by the clutch lever having a pivotal and sliding connection with the shift-bar, a radius rod pivotally connected with said shift-bar and with a limited rotative element, a drag link pivotally connected with the shift-bar and the angle lever, a contractive spring terminally connected with the shift-bar and said rotative element, and a lever operative to shift said rotative element.

11. A clutch lever throw-out for tractors, comprising a shift-bar, an arm carried by the clutch lever having a pivotal and limited sliding connection with one end of the shift-bar, a radius rod pivotally connected with the opposite end of the shift-bar and with a support, and normally disposed at an angle with respect to said shift-bar, and means operative to move the shift-bar and radius rod into substantial alinement, whereby an endwise movement is imparted to the shift-bar and locking the same against retraction.

12. A clutch lever throw-out for tractors, comprising a shift-bar, an arm carried by said lever having a pivotal and limited sliding connection with one end of said shift-bar, a rocker element, a radius rod terminally and pivotally connected with the opposite end of the shift-bar and the rocker element, a lever adapted for manually rocking said element, a contractive spring terminally connected with the shift-bar and said rocker element, and tripping means automatically operated to depress the shift-bar and radius rod into substantial alinement to impart endwise movement to the shift-bar and hold the same against retraction, said lever being operative to move the rocker element below the center of its axis for independent movement, whereby the parts will be released for return movement under the influence of the spring without releasing the tripping means.

In testimony whereof I affix my signature.

EDWARD M. HEYLMAN.